(12) United States Patent
Kobayashi et al.

(10) Patent No.: US 8,561,047 B2
(45) Date of Patent: Oct. 15, 2013

(54) OBJECT LINKAGE DEVICE FOR LINKING OBJECTS IN STATICALLY LINKED EXECUTABLE PROGRAM FILE, METHOD OF LINKING OBJECTS, AND COMPUTER READABLE STORAGE MEDIUM STORING PROGRAM THEREOF

(75) Inventors: Masaki Kobayashi, Kawasaki (JP); Masanori Iwazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 160 days.

(21) Appl. No.: 13/008,472

(22) Filed: Jan. 18, 2011

(65) Prior Publication Data

US 2011/0113412 A1   May 12, 2011

Related U.S. Application Data

(63) Continuation of application No. PCT/JP2008/001966, filed on Jul. 23, 2008.

(51) Int. Cl.
G06F 9/44       (2006.01)
G06F 9/45       (2006.01)

(52) U.S. Cl.
USPC ................................. 717/165; 717/161

(58) Field of Classification Search
USPC ....................................................... 717/165
See application file for complete search history.

(56) References Cited

U.S. PATENT DOCUMENTS

| | | | | |
|---|---|---|---|---|
| 5,437,025 A | * | 7/1995 | Bale et al. | 1/1 |
| 5,495,612 A | * | 2/1996 | Hirayama et al. | 719/331 |
| 5,499,365 A | * | 3/1996 | Anderson et al. | 717/122 |
| 5,535,392 A | * | 7/1996 | Brett | 717/145 |
| 5,625,822 A | * | 4/1997 | Brett | 717/145 |
| 5,649,200 A | * | 7/1997 | Leblang et al. | 717/122 |
| 5,787,447 A | * | 7/1998 | Smithline et al. | 1/1 |
| 6,457,174 B1 | * | 9/2002 | Kuroda et al. | 717/162 |
| 7,058,939 B2 | * | 6/2006 | Berg et al. | 717/165 |
| 7,099,889 B2 | * | 8/2006 | Berks et al. | 707/695 |
| 7,200,843 B2 | * | 4/2007 | Shann | 717/162 |
| 7,567,992 B1 | * | 7/2009 | Edwardson et al. | 1/1 |
| RE41,138 E | * | 2/2010 | Nagashima et al. | 715/835 |
| RE42,685 E | * | 9/2011 | Oesterreicher et al. | 717/171 |
| 8,117,596 B2 | * | 2/2012 | Thorley et al. | 717/122 |
| 2002/0120601 A1 | * | 8/2002 | Elmendorf et al. | 707/1 |

(Continued)

FOREIGN PATENT DOCUMENTS

| | | |
|---|---|---|
| JP | 1-129326 | 5/1989 |
| JP | 1-205332 | 8/1989 |

(Continued)

OTHER PUBLICATIONS

International Search Report for PCT/JP2008/001966, mailed Oct. 14, 2008.

(Continued)

*Primary Examiner* — Don Wong
*Assistant Examiner* — Daxin Wu
(74) *Attorney, Agent, or Firm* — Staas & Halsey LLP

(57) ABSTRACT

When a modification is applied to a statically linked executable program file, in the executable program file, an old object is replaced with a new object by adding the new object to a bottom of already-existing objects without changing the location of the old object, and the reference relationship of symbols among objects is updated and resolved and thereby a modification is applied.

6 Claims, 15 Drawing Sheets

(56) References Cited

U.S. PATENT DOCUMENTS

| | | | |
|---|---|---|---|
| 2003/0074487 A1* | 4/2003 | Akgul et al. | 709/328 |
| 2003/0122871 A1* | 7/2003 | Darlet et al. | 345/762 |
| 2006/0206866 A1* | 9/2006 | Eldrige et al. | 717/122 |
| 2008/0301658 A1* | 12/2008 | El-Kersh | 717/165 |

FOREIGN PATENT DOCUMENTS

| | | |
|---|---|---|
| JP | 6-110678 | 4/1994 |
| JP | 8-123679 | 5/1996 |
| JP | 8-137684 | 5/1996 |
| JP | 11-45179 | 2/1999 |

OTHER PUBLICATIONS

Supplementary European Search Report mailed Jan. 22, 2013 for corresponding European Application No. 08790255.7.

D. Mikulin et al., "Incremental Linking on HP-UX", Proceedings of the Workshop on Insustrial Experiences with Systems Software, 2000, pp. 47-56.

M. Ekman et al., "Real-Time Dynamic Relinking", IEEE International Symposium on Parallel & Distributed Processing, 2008, pp. 1-8.

R.W. Quong et al., "Linking Programs Incrementally", ACM Transactions on Programming languages and Systems, vol. 13, No. 1, 1991, pp. 1-20.

* cited by examiner

| OBJECT IDENTIFIER (Obj) | ADDRESS (Addr) | DELETION FLAG (Del) |
|---|---|---|

F I G. 5

| OBJECT IDENTIFIER (Obj) | SYMBOL IDENTIFIER (Sym) | ADDRESS (Addr) |

F I G. 6

| OBJECT IDENTIFIER (Obj) | SYMBOL IDENTIFIER (Sym) | REFERENCE SOURCE ADDRESS (Addr) |
|---|---|---|

F I G. 7

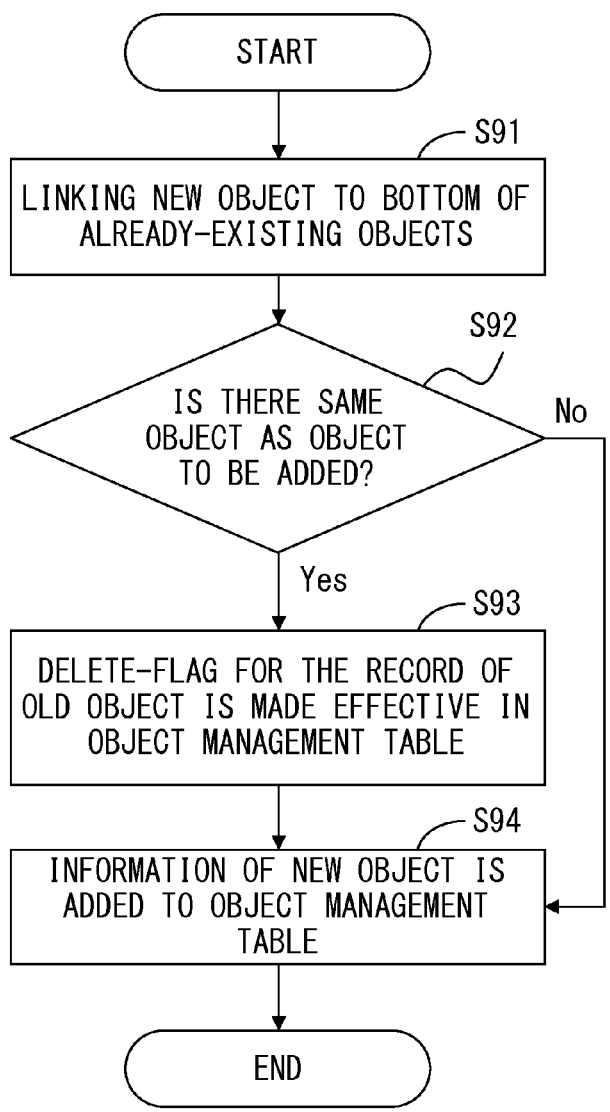
F I G. 9

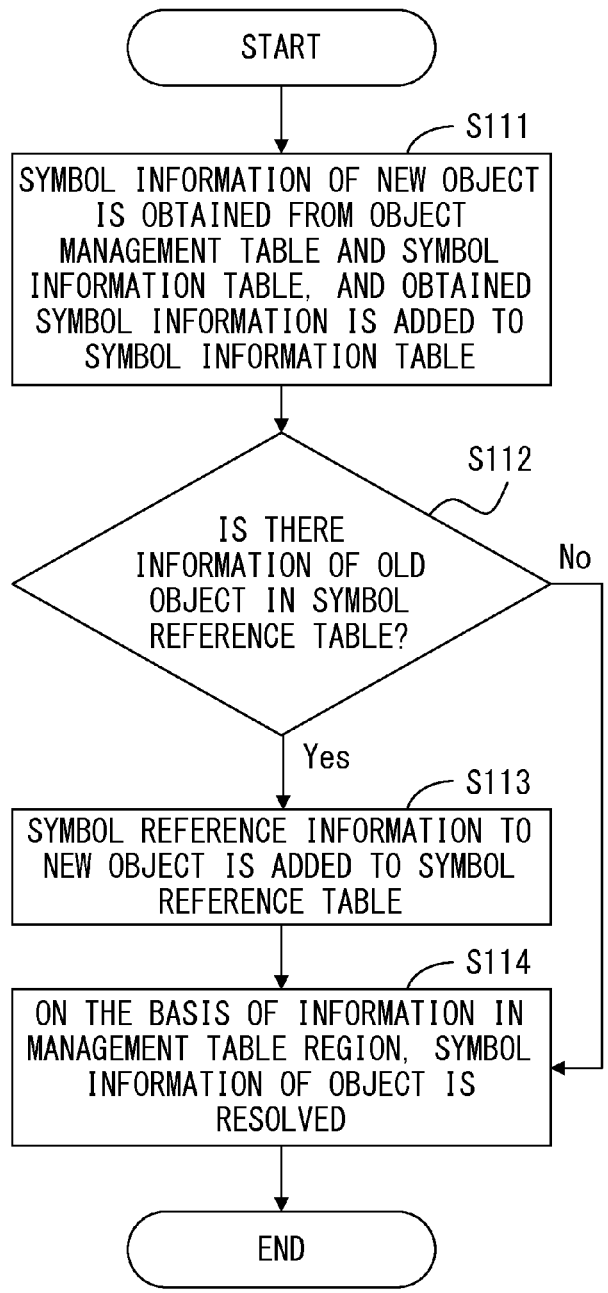
F I G. 1 1

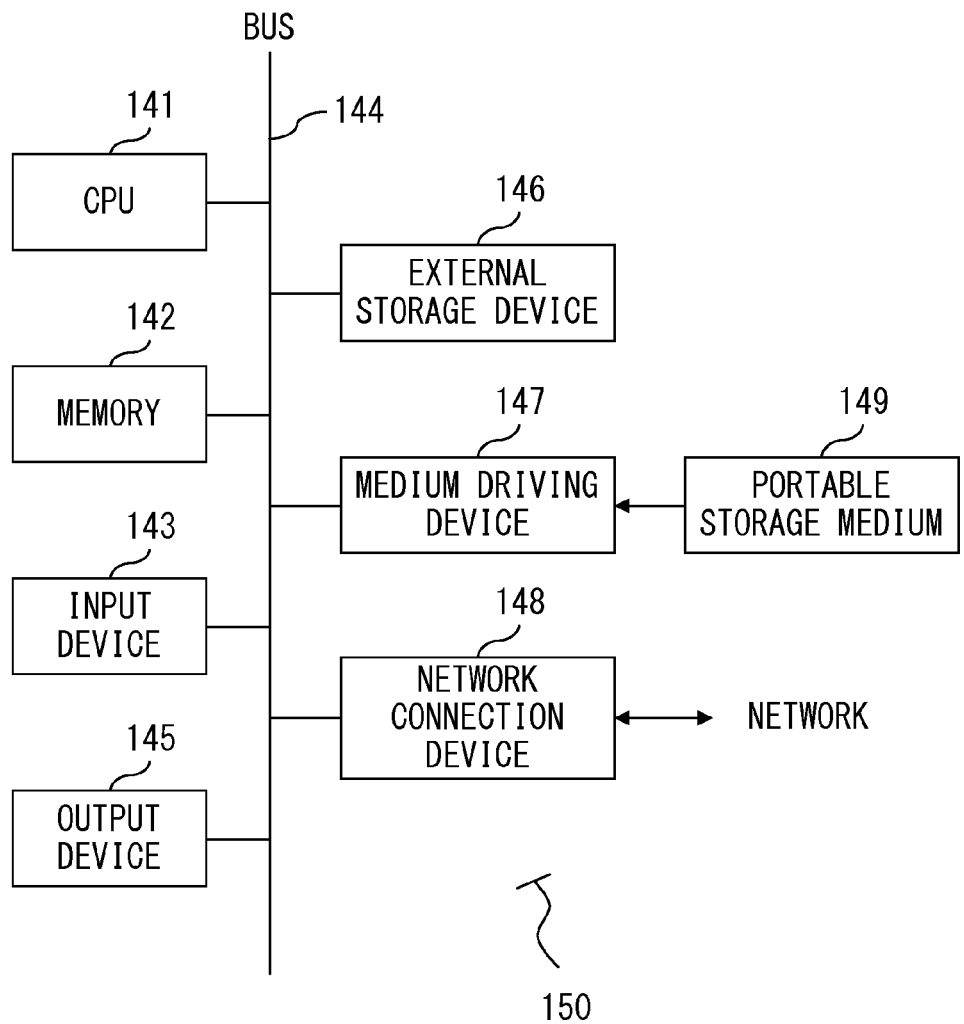
F I G. 1 4

OBJECT LINKAGE DEVICE FOR LINKING OBJECTS IN STATICALLY LINKED EXECUTABLE PROGRAM FILE, METHOD OF LINKING OBJECTS, AND COMPUTER READABLE STORAGE MEDIUM STORING PROGRAM THEREOF

CROSS-REFERENCE TO RELATED APPLICATIONS

This application is a continuation of PCT application PCT/JP2008/001966 which was filed on Jul. 23, 2008, the entire contents of which are incorporated herein by reference.

FIELD

The embodiments discussed herein relates to an object linkage device in a statically linked executable program file, a method of linking objects, and a computer readable storage medium storing program thereof.

BACKGROUND

When a modification is applied to a statically linked single executable program file such as the monolithic kernel used in Linux, conventionally, the modified objects (hereinafter, referred to as modification objects) and all the other necessary objects are re-linked by a linker and one large executable file is thereby re-generated.

Here, "static link" refers to the inclusion of the necessary library to a program when an application program is linked. In particular, it refers to the creation of a binary file in an executable format by linking an object file to the general-purpose library when the process of linking is performed.

One of the advantages of the static link is that there are no failures due to the compatibility of the necessary API (Application Program Interface) or the version number of the library.

A static link is contrasted with a dynamic link in which the library is linked when a program is executed.

FIG. 1 illustrates an example of the conventional configuration principle of the case in which a part of the statically linked executable program is modified. In FIG. 1, the case is illustrated in which a modification is applied only to an object B. As in the above-described procedure, the modified object B (new) and all the other necessary objects A, C, and D are relocated and re-linked by a linker 100 and an executable file (new) is thereby re-generated. In this case, even for a local and small modification such as a security modification, the entirety of the file generated in the above-described procedure needs to be replaced.

Moreover, when the process of re-linking is performed by the linker, as a result of the object relocation, the information of the location to which the object is relocated (symbol information) is newly generated. Generally, the new symbol information obtained from the relocation and re-linking is different from the symbol information of the original executable file. Accordingly, even if a local modification is performed, the entirety of the executable file is changed from the original file.

FIG. 2 illustrates the case in which the process of re-linking is performed in order to modify only the object B for a kernel file (old). An object B (new) is replaced with an object B (old), and thereby the positional information (address) of objects C, D, and E is changed from addr-c0, addr-d0, and addr-e0 to addr-c1, addr-d1, and addr-e1, respectively. Hence, it is apparent that the data is re-written even for the other objects A, C, D, and E which would otherwise not require any modification (for example, when the object C is referred to from addr-ax of the object A, it was addr-co in the kernel file (old), but it is rewritten to addr-c1 in the kernel file (new)).

As described above, when a portion of the statically linked executable program is modified, even for a small and local modification, it was necessary to replace the entirety of the file. Moreover, the objects are relocated and thereby the symbol information of the relocated position or the like is newly generated, and thus the data needed to be re-written even for the other objects which would otherwise not require any modification. Furthermore, as a device driver provided as a kernel module depends on the symbol information, it was necessary to prepare a compatible module in accordance with the applied modification, and the device driver needed to be reinstalled.

On the other hand, for the mission critical systems which have been increasingly used in recent years, the period of time during which the system can be stopped is more restricted compared with the conventional systems. Accordingly, there are increasing demands for shortening the period of time during which the system is stopped due to the operation of applying the program modification, or for minimizing the effect to the system due to the application of modification.

For this purpose, when a part of the statically linked executable program as above is modified and applied, it is desired that the process of replacing the entirety of the file or rewriting the file of the symbol information or the like be minimized, and that the period of time during which the program modification is applied to the system be shortened as much as possible. Moreover, for cases in which a failure occurs to the new program after a modification is applied, it is desired that the original old program be restored to provide a more stable system.

Various technologies have been proposed in order to solve these problems.

First, in modules (=executable programs) and a plurality of programs (=objects) that constitute these modules, the technology of replacing the modification program such that the effect on the non-modified programs will be minimized is known. This technology is realized by providing a management function for managing the elements of the modules or programs. However, the position at which the modification object is replaced is not described, and thus it is not possible to restore the older version when the modification is inappropriate.

Moreover, the linker technology, characterized by performing the replacement and insertion of an object module (=object) in a load module (=executable program file), is known. In detail, this technology is realized by arranging the object module in the free area of the load module (in particular, at the position of the original object module). However, in this technology, the configuration is such that the processes of linking is performed as in the conventional art when there is no free area. Accordingly, the advantageous effects of the partial linkage may not be obtained. In addition, it is not possible to restore the older version when the modification is inappropriate.

The conventional method for applying a modification to a statically linked executable program has been described above, and the problems thereof are summarized as follows.
1) Because the size of an executable file is large, its distribution and acquisition is difficult, and the modification application period becomes longer. In particular, when a modification is applied to hundreds or thousands of executable files, the effect on the modification application period becomes significant.

2) When the restoration (roll back) is performed after a modification is applied, it is necessary to bring back to the system the entirety of the executable file which was backed up in advance. When a modification is applied to a large number of executable files, the effect on the period of time for the restoration becomes significant.

3) As a device driver or the like provided as a kernel module depends on the symbol information, it is necessary to prepare a compatible module in accordance with the applied modification, and the device driver or the like needs to be reinstalled.

4) When a modification is applied, changes are made, e.g., the symbol information is rewritten, even for the objects which do not involve any modification. Accordingly, in mission critical systems which require a high reliability, the entirety of the program needs to be re-examined.

[Patent Document 1] Japanese Laid-open Patent Publication No. 1-129326

[Patent Document 2] Japanese Laid-open Patent Publication No. 1-205332

SUMMARY

The present invention has been made in view of the above-mentioned problems, and it is an object of the invention to provide a linking method with a program and the device thereof for when a modification is applied to a statically linked executable program, shortening the modification period as much as possible, and minimizing the effects of the modification on the portions which do not involve any modification. In addition, it is also an object of the invention to shorten the restoration period as much as possible when a restoration is performed.

According to a method of linking objects of the present invention, when a modification is applied to an executable program, i.e., when an old object is replaced with a new object, the old object is replaced with the new object without deleting the old object. That is, when an object is replaced, the old object is not overwritten but a new object is added to the bottom of a plurality of existing objects such that the data and information of both the old object and new object can be managed. It is also specifically controllable as to which of the old object and the new object is effective. In addition, a region is provided at the bottom of executable program files (i.e., right after the added new object), which holds an object management table for managing the effectiveness/ineffectiveness of the new object and the old object and managing the symbol information among the objects.

Due to such configuration, the following advantageous effects can be obtained.

First of all, the size of the modification file to be distributed becomes small, and thus its distribution and acquisition becomes easy. Moreover, the modification application period, i.e., the period for updating the program, is shortened. Further, when a failure occurs after a modification is applied, on the basis of the management information it is easy to roll back to the state before the modification is applied. What is more, as the effect on external modules such as a device drive will be minimized, when a modification is applied to a program file, the chances of needing to perform the regeneration and reinstallation of a driver module are largely reduced. Finally, the operation of an old program file is secured for the objects that do not involve any modification, and thus it is possible to reduce the number of processes in an examination as the extent of an examination is narrowed down.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram showing the configuration of an object management table;

FIG. 6 is a diagram showing the configuration of a symbol information table;

FIG. 7 is a diagram showing the configuration of a symbol reference table;

FIG. 9 is a diagram illustrating the flow of how objects are linked by a file linkage unit;

FIG. 11 is a diagram illustrating the flow of how the symbol information is resolved by a symbol information resolution unit;

FIG. 14 is a diagram illustrating the configuration of an information processing unit in the embodiment.

DESCRIPTION OF EMBODIMENTS

An embodiment of an object linkage device for linking objects in a statically linked executable program file and a method of linking objects will be described with reference to the accompanying drawings.

Figure 1:
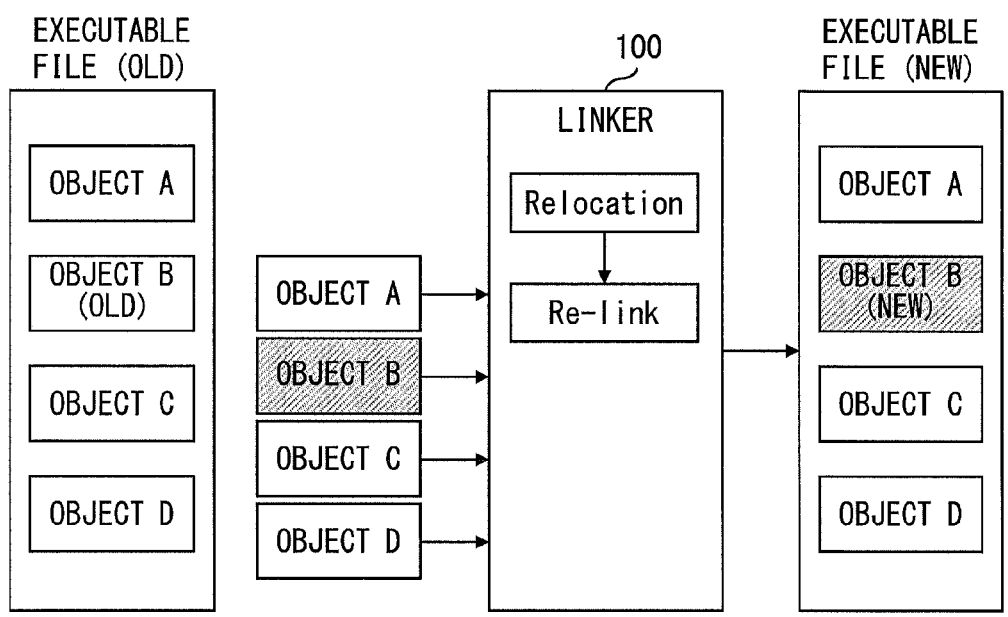
FIG. 1 is a diagram illustrating the conventional configuration principle.
Figure 2:
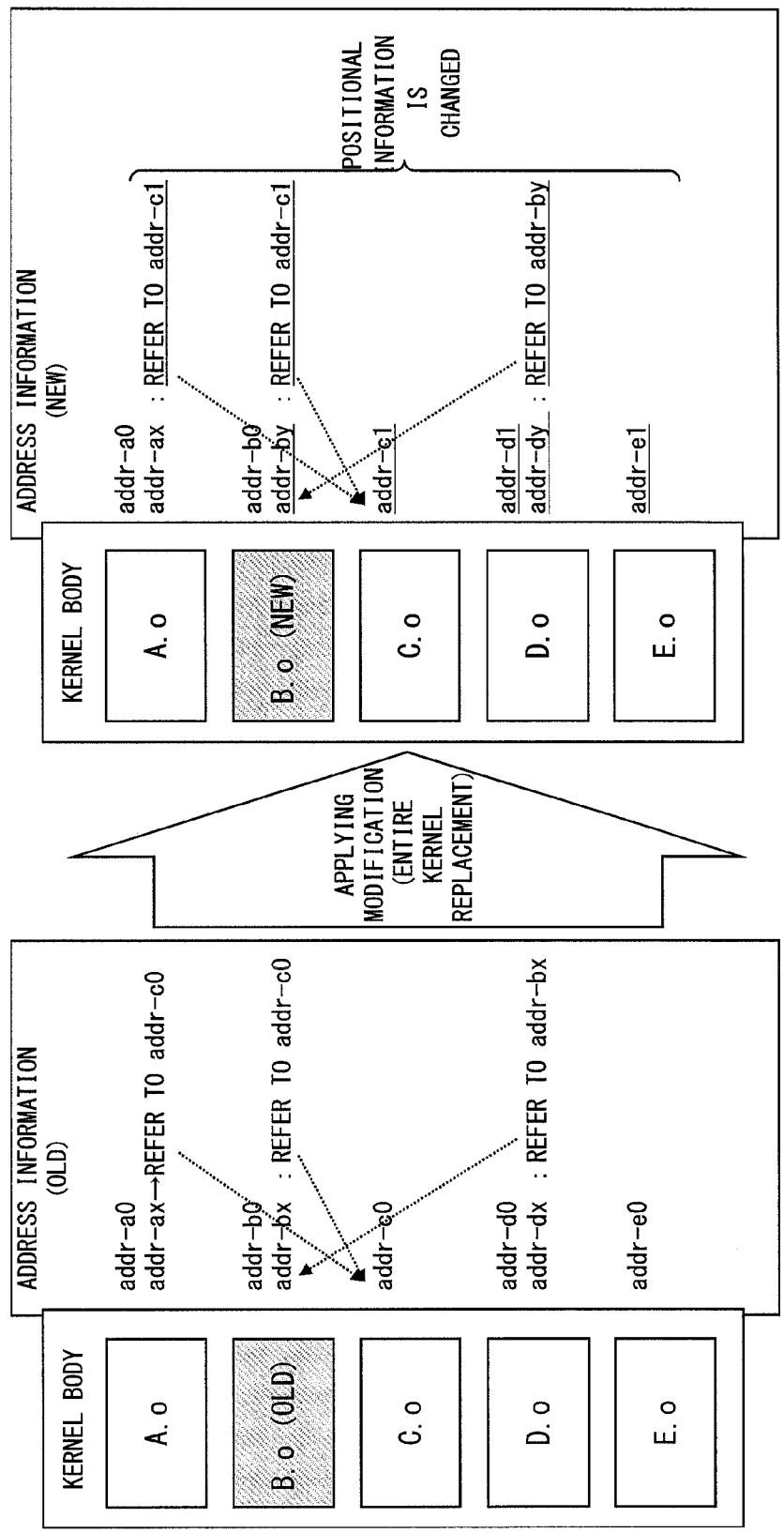
FIG. 2 is a diagram illustrating the case of the conventional configuration in which a modification is applied to an executable program.
Figure 3:
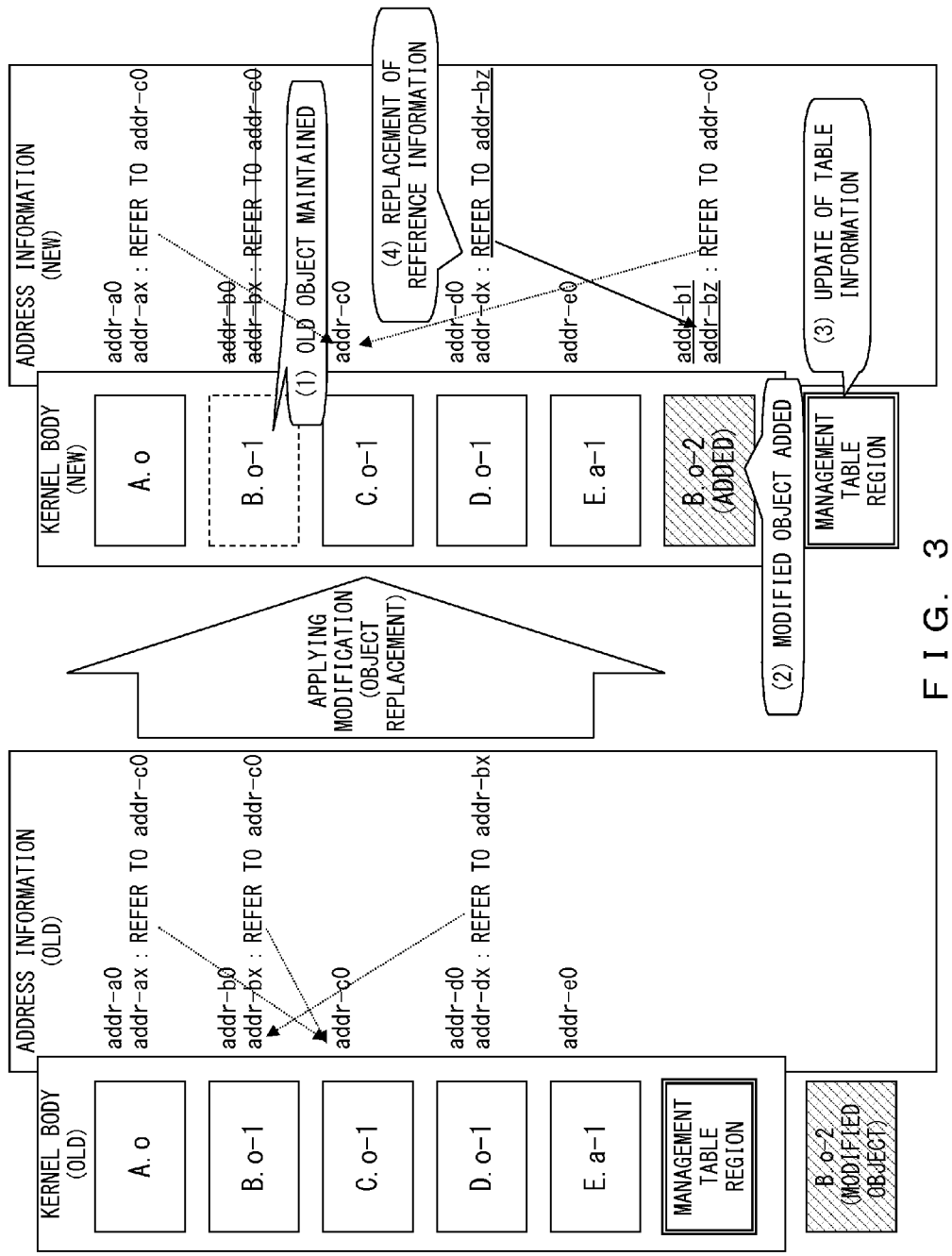
FIG. 3 is a diagram illustrating the configuration principle of the embodiment.

Firstly, a description is given with reference to the configuration principle of FIG. 3.

A kernel body is a file provided with a plurality of objects (A.o, B.o, C.o, and D.o) and a region holding a management table for managing the objects, symbol information in the objects, and so forth ("E.a" is a source file of the assembler language, and is shown in FIG. 3 because it is a file which is actually included in the kernel; however, it will be omitted in the following description).

FIG. 3 illustrates the case in which an object B.o-1 of a kernel body (old) is updated to an object B.o-2 and a kernel body (new) is thereby obtained.

When a modification is applied, firstly, the new object of object B.o-2 is linked to a kernel body file. Here, the old object of object B.o-1 is not deleted but maintained just as it was ((1) of FIG. 3), and the new object B.o-2 is incorporated between the bottom of already-existing objects and an object management table ((2) of FIG. 3).

Next, the positional information of the added new object B.o-2 is newly calculated, and the information in the object management table is updated ((3) of FIG. 3). Further, on the basis of a value in the updated object management table, the positional information of the other already-existing objects which refer to the new object B.o-2 ((4) of FIG. 3) is changed.

By applying a modification to an executable program as described above, the relocation of the already-existing objects is not necessary, and only the symbol information of a new object needs to be rewritten. Accordingly, the modification application period can be shortened. Moreover, in the event of failure after a modification is applied, since the old object is not deleted, the system can be restored (rolled back) to the previous state only by activating the old object. Regarding the already-existing objects that are not involved in the modification, the operation of an old program file is secured. Further, as the file modification is not performed on the entirety of the program as in the conventional art, the effect on the external modules such as a device drive will be minimized. Accordingly, the chances of the recreation or reinstallation of driver modules at the time of applying the modification are largely reduced.

Hereinafter, an embodiment of an object linkage device for linking the objects in a statically linked executable program file as well as a method of linking objects will be described in detail.

Figure 4:
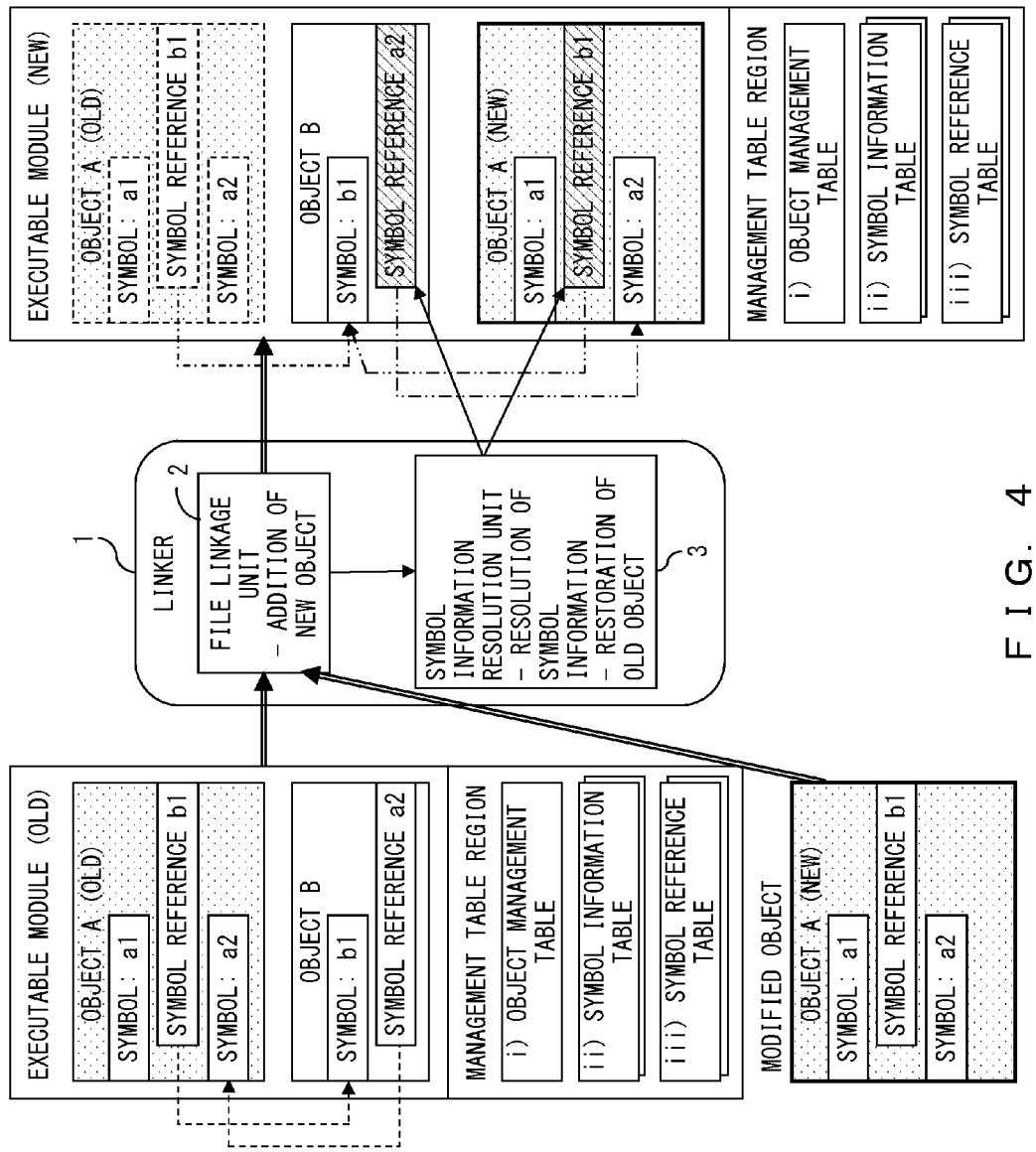
FIG. 4 is a general block diagram of the embodiment.

FIG. 4 is a general block diagram.

An executable module is an executable program, and is provided with objects and a management table region that manages the objects.

A linker 1 is provided with a file linkage unit 2 and a symbol information resolution unit 3. The linker 1 generates an executable module (new) by using a new object which includes an executable module (old) and the modification information as an input.

The file linkage unit 2 adds the new object to the bottom of the group of already-existing objects (re-link), and records that information onto an object management table.

The symbol information resolution unit 3 converts the symbol information of all the re-linked objects into a specific address, and records that information onto the object management table ("i)" of FIG. 3). The old object is restored when the executable module (new) is to be rolled back to the execution module (old).

The management table region of the executable module is provided with the aforementioned object management table ("i)" of FIG. 3), a symbol information table ("ii)" of FIG. 3), and a symbol reference table ("iii)" of FIG. 3). The configuration of each table is shown in FIGS. 5, 6, and 7, respectively.

FIG. 5 shows the configuration of the i) object management table.

On the object management table, the information of the objects (the object identifier and the address) and the information of whether these objects are currently effective are recorded. A delete flag indicates whether there was replacement by a new object. In the present embodiment, when this delete flag is effective, it is indicated that the object has been replaced by a new object.

FIG. 6 shows the configuration of the ii) symbol information table.

On the symbol information table, the symbol information included in each of the objects (the symbol identifier and the address of the symbol) is recorded.

FIG. 7 shows the configuration of the iii) symbol reference table.

On each of the objects, the information of the symbol reference to the other objects (the symbol identifier of the reference destination and the address of the reference source) is recorded.

The configuration of the tables for managing the objects is shown in FIGS. 5 through 7, and in the following description, each line of the tables is referred to as a record, depending on the context.

In FIG. 4, the linker 1 generates an executable module (new) by using inputs of an executable module (old) as well as an object A (new) as the modification object.

On this occasion, the file linkage unit 2 links the object A (new) to the executable module (old).

Moreover, before the modification is applied, there are references in the executable module (old) including the references to symbol a1 and symbol a2 in the object A (old) as well as the reference to symbol b1 in an object B; and the symbol information resolution unit 3 resolves the relationship of these symbols.

Further, after the modification is applied, when the executable module (old) is to be restored from the executable module (new), the symbol information resolution unit 3 restores the old object by modifying the information of the three tables in the management table region.

FIG. 4 has been briefly described in the above, and "1. Object Linkage" and "2. Resolution of symbol Information" for applying a modification to the executable program, and "3. Restoration of Object" for restoring the executable program will now be described in detail with reference to the accompanying drawings.

1. Object Linkage

Figure 8:
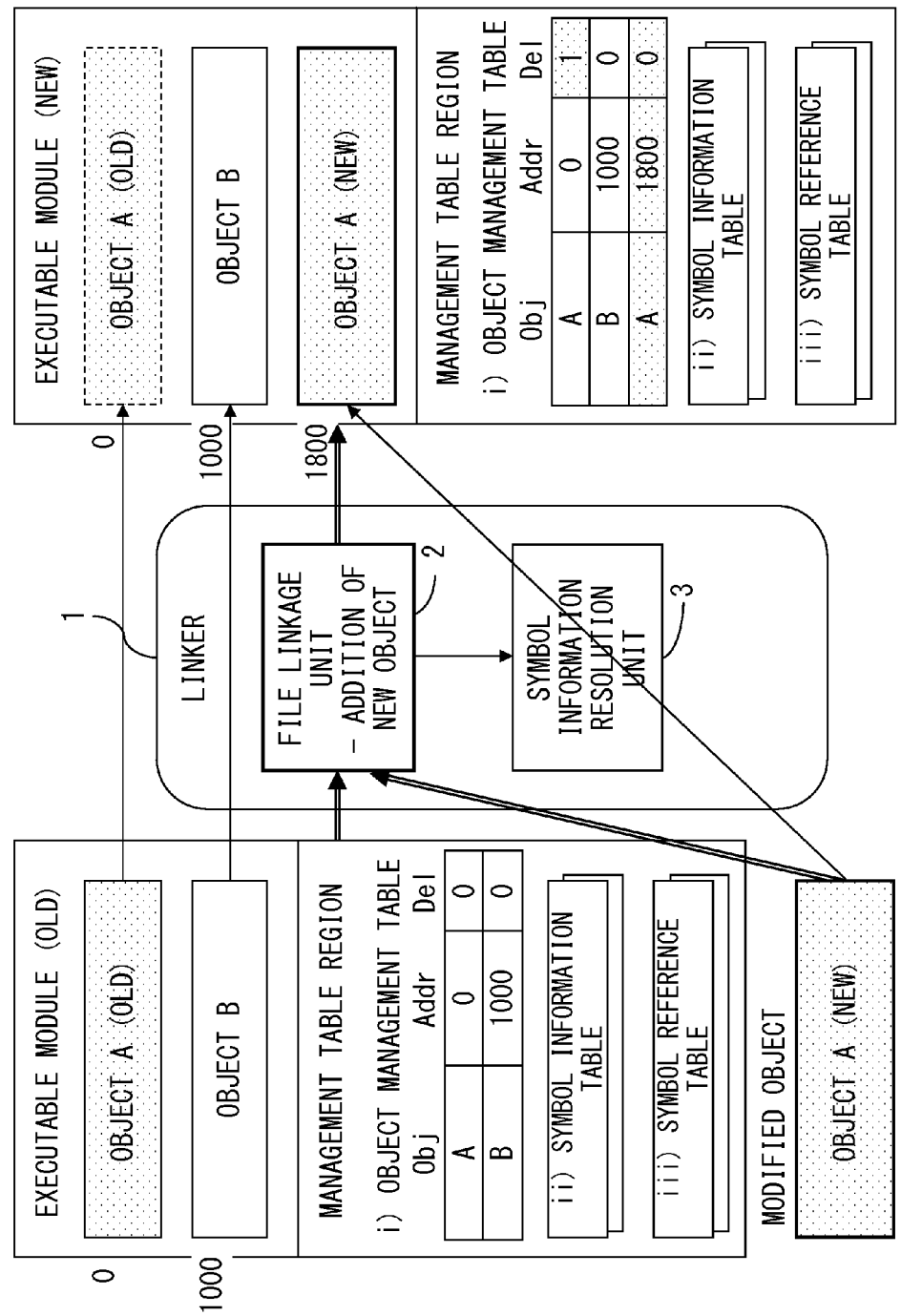
FIG. 8 is a diagram illustrating how objects are linked.

FIG. 8 is a diagram illustrating how objects are linked.

The file linkage unit 2 of the linker 1 re-links objects when a modification is applied to the executable program. On this occasion, the process of linking is performed by adding a new object to the bottom without changing the order or positions of the already-existing objects which include the old object. Further, on the basis of the information about the situation after the process of linking is performed, the i) object management table is updated.

In FIG. 8, firstly, the file linkage unit 2 of the linker 1 links the object A (new) by adding it to the bottom of the already-existing objects while the object A (old) is maintained just as it was. Subsequently, in the i) object management table, a delete flag of the object A (old) is made effective, and the information of the object A (new) (object identifier=A, address=1800, delete flag=0 (indicating ineffectiveness)) is additionally registered. Note that when the modification object is a new object, only the addition to the i) object management table is performed.

FIG. 9 illustrates the process flow of how objects are linked by the file linkage unit 2.

First, a new object is linked to the bottom of the already-existing objects in S91. Next, in S92, the i) object management table is referred to, and thereby it is determined whether or not the same object as the object to be added exists. When the same object does not exist (No), it proceeds to S94. When the same object exists (Yes), it proceeds to S93, and the delete flag for the record of the old object is made effective in the i) object management table. Then, the information of the new object is added to the i) object management table in S94.

2. Resolution of Symbol Information

After the process of linking objects is performed, the symbol information resolution unit 3 of the linker 1 resolves the symbol information of the re-linked executable module. On the basis of the information of the ii) symbol information table and the iii) symbol reference table, the symbol information of the added new object is obtained, and the record of the ii) symbol information table and the iii) symbol reference table is added.

Figure 10:
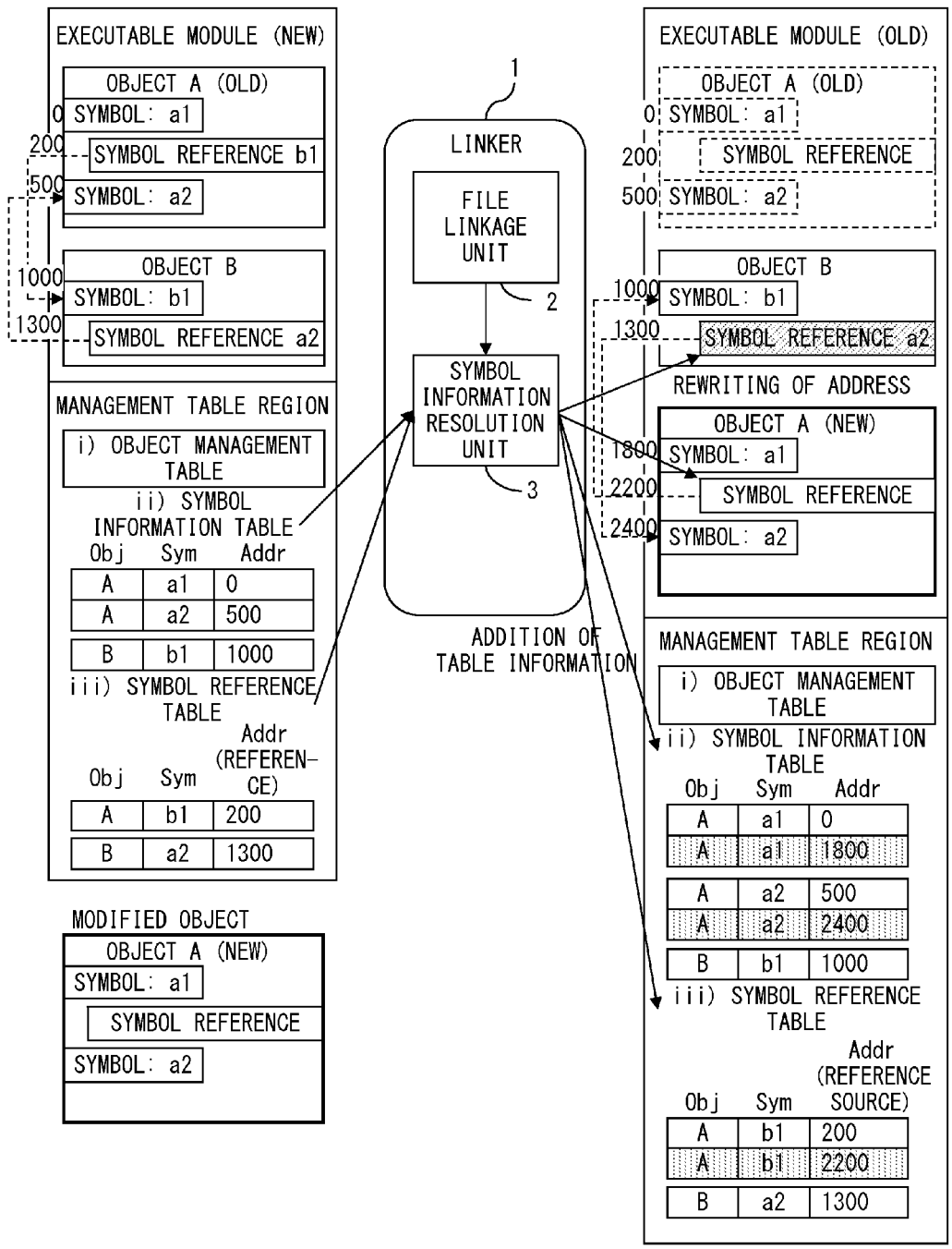
FIG. 10 is a diagram illustrating how the symbol information is resolved.

FIG. 10 illustrates how the symbol information is resolved after the objects are linked as in FIG. 8.

When an object A (new) is added, on the basis of the record of the i) object management table and the ii) symbol information table of the object A (old), the symbol information of object A (new) (a1/1800, a2/2400) is firstly obtained, and the obtained symbol information is added to the ii) symbol information table as a record. Further, the record of the object A (old) is searched from the iii) symbol reference table, and when this record (b1/200) exists, the information of the object A (new) (b1/2200) is added to the symbol reference table as a new record. On the basis of the table information above, the symbol reference information (a2) of the object A (new) included in the object B is updated.

FIG. 11 illustrates the process flow of how the symbol information is resolved.

First, in S111, the symbol information resolution unit 3 obtains the symbol information of the new object from the i) object management table and the ii) symbol information table, and add the obtained symbol information to the ii) symbol information table.

Next, in S112, it is determined whether or not the information of the old object exists in the iii) symbol reference table. When the information does not exist (No), it proceeds to S114. When the information exists (Yes), it proceeds to S113. In S113, the symbol reference information to the new object is added to the iii) symbol reference table. In S114, on the basis of the i) object management table, the ii) symbol information table, and the iii) symbol reference table, the symbol information of the object is resolved.

3. Restoration of Object

After the modification is applied to the executable module, there are cases in which the previous executable module needs to be restored for some reason. In these cases, the symbol information resolution unit 3 of the linker 1 restores the object of the previous generation on the basis of the information on the i) object management table, the ii) symbol information table, and the iii) symbol reference table.

Figure 12:
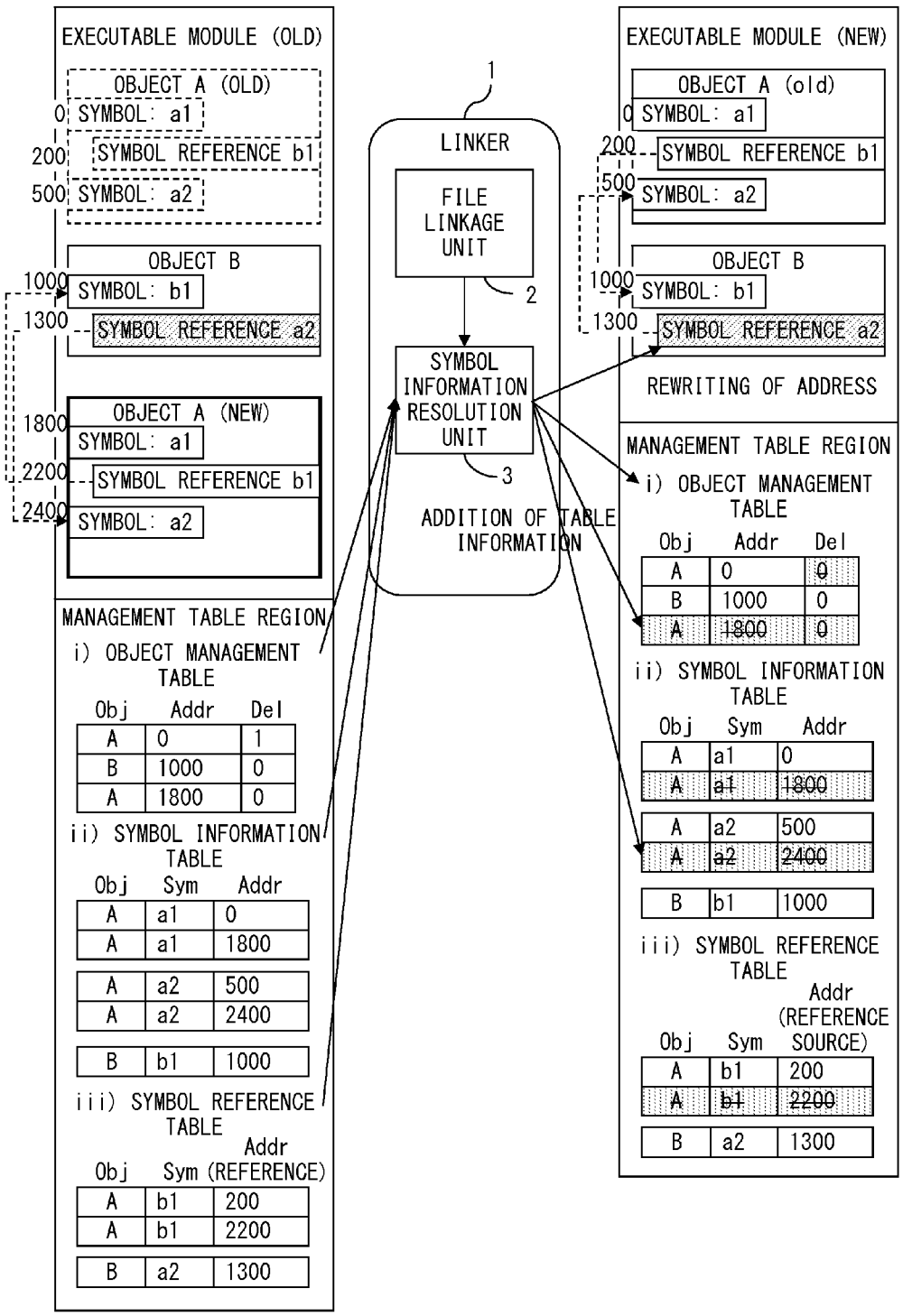
FIG. 12 is a diagram illustrating how an object is restored.

FIG. 12 illustrates the cases in which the executable module (new) of FIG. 10 is rolled back to the executable module (old). That is, it is about the case in which the object A (old) is restored.

In these cases, when the record of the object A whose delete flag is effective exists in the i) object management table, the lastly added record is searched from the i) object management table, the ii) symbol information table, and the iii) symbol reference table, and is deleted (A/1800/0 of the object management table; A/a1/1800 and A/a2/2400 of the symbol information table; and A/b1/2200 of the symbol reference table). Then, the delete flag of the object A (old) in the i) object management table is made ineffective (value is changed from "1" to "0"). On the basis of the updated table information, the symbol reference information of the other objects included in each of the objects is updated again.

Figure 13:
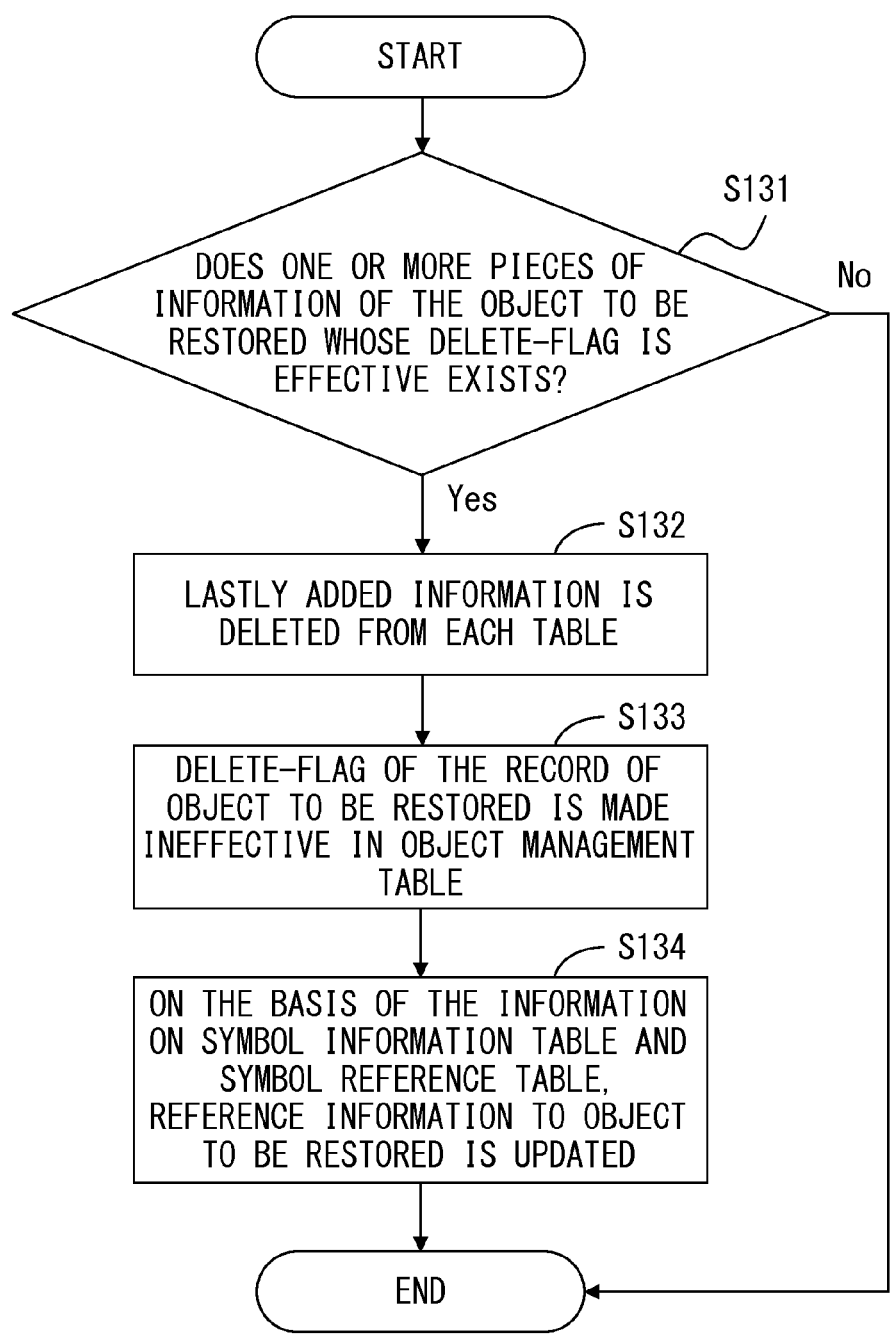
FIG. 13 is a diagram illustrating the flow of how an object is restored by a symbol information resolution unit.

FIG. 13 illustrates the process flow of how an object is restored.

First, in S131, it is determined whether or not one or more pieces of information of the object to be restored whose delete flag is effective exist in the i) object management table. When such a piece of information does not exist (No), the process terminates as it is not possible to perform the restoration. When such a piece of information does exist, the process proceeds to S132.

In S132, the last-added information is deleted from each of the tables. The last-added information is the information of the new object which is linked in order to modify the object to be restored (old object).

In S133, the delete flag of the record of the object to be restored is made ineffective in the i) object management table.

Further, in S134, on the basis of the information on the ii) symbol information table and the iii) symbol reference table, the reference information to the object to be restored is updated.

In the above, the embodiment of an object linkage device for linking objects in a statically linked executable program file as well as a method of linking objects has been described in detail.

According to the above described embodiment, even if a modification is applied to an executable program, i.e., even if an object A (new) is linked, the relocation of the already-existing objects is not necessary, and the symbol information needs to be rewritten only with respect to the information of the newly added object. Accordingly, compared with the conventional art, the modification application period can significantly be shortened. Moreover, when the system of the previous generation is desired to be restored, the previous system can easily be restored (rolled back) as the object A (old) is not deleted. Further, regarding the already-existing objects that are unrelated to any modification, the operation of an old program file is secured.

In the above, the present embodiment has been described with reference to the accompanying drawings. Further, the hardware configuration of an information processing unit 150 which realizes the above described embodiment is illustrated in FIG. 14. The information processing unit 150 is provided with a CPU 141, a memory 142, an input device 143, an output device 145, an external recording device 146, a medium driving device 147, a portable recording medium 149, and a network connection device 148, all of which are connected through a bus 144.

The memory 142 includes, for example, a ROM (Read Only Memory), a RAM (Random Access Memory) and so forth, and stores the data such as objects or executable files as well as a program for realizing a linker.

The CPU 141 executes a program by using the memory 142, and thereby realizes processes such as the process of applying a modification to an executable file.

The input device 143 is, for example, a keyboard, a pointing device, or a touch panel. The output device 145 is, for example, a display or a printer.

The external storage device 146 is, for example, a magneto-optical disk device, an optical disc device, or a magneto-optical disk device. The program and data may be stored in this external storage device 146, and be loaded into the memory 142 as necessary to be used therefrom.

The medium driving device 147 drives the portable storage medium 149 to access the data recorded therein. The portable storage medium 149 may be any computer-readable recording medium such as a memory card, a memory stick, a flexible disc, a CD-ROM (Compact Disc Read Only Memory), an optical disc, a magneto-optical disk, or a DVD (Digital Versatile Disk). The program and data may be stored in this portable storage medium 149, and be loaded onto the memory 142 as necessary to be used therefrom.

The network connection device 148 communicates with external devices via any network (line) such as the LAN or WAN, and converts the data as necessitated by the communication. Further, it is also possible for the network connection device 148 to receive the program and data from external devices, and to load the program and data to the memory 142 as necessary to be used therefrom.

The program executed on the information processing unit 150 is configured so as to perform the process of the above-described linker (file linkage unit, symbol information resolution unit) by using the memory of the information processing unit 150 or the like. For example, the flows in FIG. 9, FIG. 11, and FIG. 13 as described above may be performed by the program.

Figure 15:
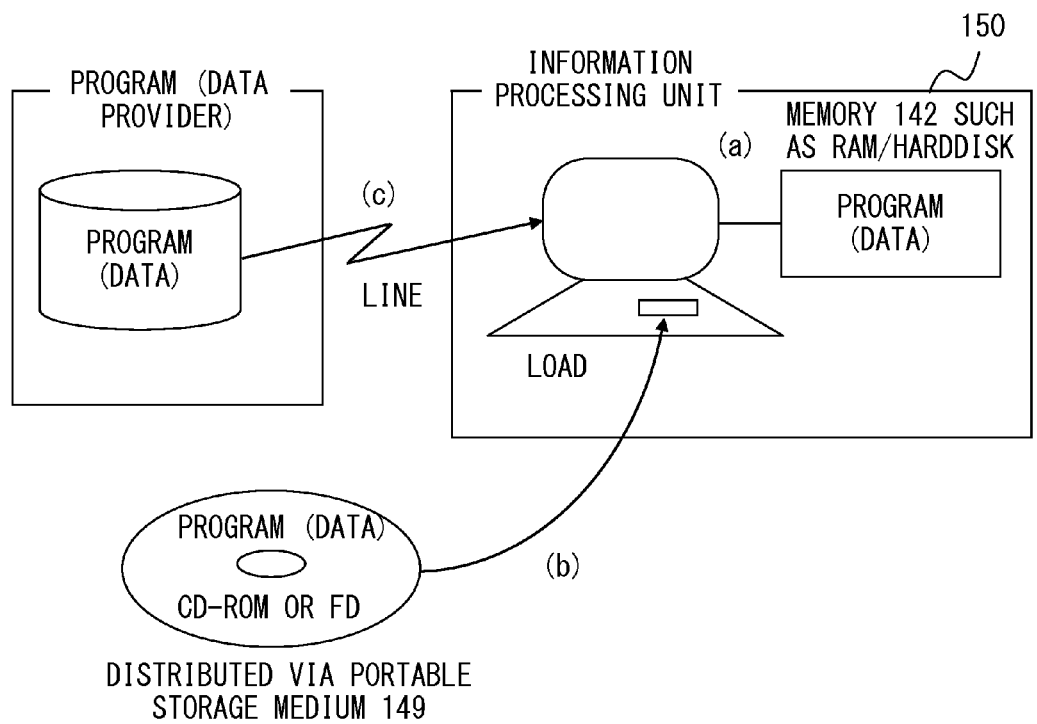
FIG. 15 is a diagram illustrating how a program is loaded into a computer in the embodiment.

FIG. 15 illustrates a method of loading the program to the information processing unit when the information processing unit 150 executes the program and thereby a modification is applied to an executable program.

FIG. 15(*a*) illustrates how the information processing unit 150 loads the program or data which is stored in the external storage device such as a hard disk of the information processing unit 150.

FIG. 15(*b*) illustrates how the program or data recorded on the portable storage medium such as a CD-ROM or DVD is loaded via a medium driving device of the information processing unit 150.

FIG. 15(*c*) illustrates how the program or data provided by an information provider through a line such as the network is loaded via a communication device of the information processing unit 150.

The above-described embodiment may be configured as a program for making an information processing unit perform the above-described process of applying a modification to an execution program by a linker. Moreover, the above-described embodiment may be configured as a computer-readable recording medium on which a program for making an information processing unit perform the above-described process by a linker is recorded. Furthermore, the above-described embodiment may be configured as a computer data signal representing the above-described program of a linker in a carrier wave.

While the embodiment of an object linkage device for linking objects in a statically linked executable program file and a method of linking objects has been described above in detail, it should be understood that the present invention is not limited to this embodiment, and the present invention may be modified into various configurations or shapes without departing from the spirit or scope of the invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An object linkage device for linking objects in an executable program file, the object linkage device comprising:
a processor that adds to a bottom of an already-existing object a new object which replaces an old object to be updated in the executable program file;
a management table for recording an identifier of an object, an address indicating positional information of the object, and a flag indicating whether the object is currently effective, the processor recording an identifier of the new object and an address indicating the positional information of the new object on the management table, and changing a flag of the old object to be updated in the management table to information indicating the old object is ineffective;
an object management table that manages objects by recording identifiers of each object, address information of each object, and flags indicating whether each object was replaced with the new object;
a symbol information table that manages symbols of each object by recording the identifiers of the each object and the address information of the each object; and
a symbol reference table that manages a symbol reference by recording the identifiers of the each object to which the each object refers, and a reference source from which the each object refers to the each symbol,
wherein the processor records an identifier of the new object and the address information of the new object to the object management table and changes a state of the flag of the old object to be updated to indicate that the old object to be updated is replaced with the new object, and the processor adds symbol address information indicating a symbol identifier of the symbol of the added new object to the symbol information table, adds the address information of the added new object to the symbol reference table, and updates old symbol information corresponding to the old object to be updated to new symbol information corresponding to the new object on the basis of the object management table, the symbol information table, and the symbol reference table.

2. The object linkage device according to claim 1, wherein the processor
changes the state of the flag of the old object to be updated to indicate that old object to be updated is not replaced with the new object after the processor updates the old symbol information corresponding to the old object to be updated to the new symbol information corresponding to the new object,
deletes the symbol address information of the new object added to the symbol information table and the identifier of the new object added to the symbol reference table when the new object is linked to the executable program file by the processor, and
rolls back the executable program file to a state before the new object is linked.

3. A method of linking objects in an executable program file, the method comprising:
when updating the executable program file,
adding to a bottom of already-existing objects a new object which replaces an old object to be updated in the executable program file;
making the old object become ineffective; and
recording an identifier of an object, an address indicating positional information of the object, and a flag indicating whether the object is currently effective,
wherein the adding includes recording an identifier of the new object and an address indicating positional information of the new object, and changing a flag of the old object to be updated to information indicating the old object is ineffective,
an object management table is provided that manages the object by recording identifiers of each object, address information of each object, and flags indicating whether each object was replaced with the new object,
when the new object is added, an identifier of the new object and the address information of the object are recorded in the object management table, and a state of the flag of the old object to be updated is changed to indicate that the old object to be updated is replaced with the new object,
a symbol information table is provided that manages symbols of each object by recording the identifiers of the each object and the address information of the each object, and a symbol reference table is provided that manages a symbol reference by recording the identifiers of the each object to which the each object refers, and a reference source from which the each object refers to the each symbol, and when the identifier of an object, the address indicating positional information of the object, and the flag indicating whether the object is currently effective are recorded, symbol address information indicating a symbol identifier of the symbol of the added new object is added to the symbol information table, the address information of the added new object is added to the symbol reference table, and old symbol information corresponding to the old object to be updated to new symbol information corresponding to the new object is updated on the basis of the object management table, the symbol information table, and the symbol reference table.

4. The method according to claim 3, further comprising:

changing the state of the flag of the old object to be updated to indicate that old object to be updated is not replaced with the new object after the updating the old symbol information corresponding to the old object to be updated to the new symbol information corresponding to the new object in the symbol information updating step;

deleting the symbol address information of the new object referred to in the symbol information table and the identifier of the new object referred to the symbol reference table when the new object is linked to the executable program file; and rolling back the executable program file to state before the new object is linked.

5. A non-transitory computer readable record medium storing a program used on a computer to direct an information processing unit to perform a process of linking objects in an executable program file, the process comprising:

a file linking step of adding to a bottom of already-existing objects a new object which replaces an old object to be updated in the executable program file; and a step of recording an identifier of the object, an address indicating positional information of the object, and a flag indicating whether the object is currently effective, wherein the computer comprises an object management table that manages the object by recording identifiers of each the object, address information of each object, and flags indicating whether each object was replaced with the new object, wherein the file linking step includes recording an identifier of the new object and an address indicating positional information of the new object, and changing a flag of the old object to be updated to information indicating the old object is ineffective, recording an identifier of the new object and the address information of the new object to the object management table and changing a state of the flag of the old object to be updated to indicate that the old object to be updated is replaced with the new object, a symbol information table is provided that manages symbols of each object by recording identifiers of the each object and the address information of the each object, and a symbol reference table is provided that manages a symbol reference by recording the identifiers of the each object to which the each object refers, and a reference source from which the each object refers to the each symbol, and the file linking step includes adding symbol address information indicating a symbol identifier of the symbol of the added new object to the symbol information table, adding the address information of the added new object to the symbol reference table, and updating old symbol information corresponding to the old object to be updated to new symbol information corresponding to the new object on the basis of the object management table, the symbol information table, and the symbol reference table.

6. The non-transitory computer readable record medium according to claim 5, the process further comprising a rolling back step of changing the state of the flag of the old object to be updated to indicate that old object to be updated is not replaced with the new object after the updating the old symbol information corresponding to the old object to be updated to the new symbol information corresponding to the new object in the symbol information updating step, deleting the symbol address information of the new object added to the symbol information table and the identifier of the new object referred to the symbol reference table when the new object is linked to the executable program file in the file linking step, and rolling back the executable program file to a state before the new object is linked.

* * * * *